United States Patent Office.

NATHAN EISENDRATH, OF CHICAGO, ILLINOIS.

Letters Patent No. 90,827, dated June 1, 1869.

---

IMPROVED TREATMENT OF GRAIN-MASHES, WORTS, AND BEER, AFTER FERMENTATION.

---

The Schedule referred to in these Letters Patent and making part of the same.

---

*To all whom it may concern:*

Be it known that I, NATHAN EISENDRATH, of Chicago, in the county of Cook, and State of Illinois, have invented certain new and useful Improvements in the Treatment of Grain-Mashes, Worts, or Beer; and I do hereby declare that the following is a full, clear, and exact description thereof.

To enable others skilled in the art, to construct and use my invention, I will proceed to describe it.

My invention relates to processes for treating grain-mashes, worts, or beer, prior to distillation; and consists in the production of a new and useful compound, or wash, and in applying it to the grain-mashes, worts, or beer, produced by the processes patented to Alois Fleischmann, July 12, 1864, and to Joseph Fleischmann, January 3, 1865, after the fermentation is ended, and before the distillation.

I have discovered that the mashes produced by the processes patented to the Messrs. Fleischmann, mentioned above, during fermentation, form or produce ether and acid, in such large quantities as to seriously reduce the merchantable value of the high-wines or raw whiskey distilled from them, on account of the peculiar odor and taste which their presence imparts.

The object of my invention is to clean or clear the mashes of the ether and acid thus produced.

To accomplish this, I take fifty pounds of lime, of the best quality, and dissolve it in about two hundred and fifty gallons of water, and thus make a solution of lime-water. I then take from two hundred to two hundred and fifty bushels of the grain mashed by the process patented to the said Fleischmanns, after the fermentation is ended and it is ready for distillation, and sprinkle it well with the lime-water; and while it is being thus sprinkled, I thoroughly stir and agitate the whole mass, so as to bring every particle of it in contact with the lime-water.

After this, I allow it to rest for ten or twelve hours, and then distil it in the usual manner.

The effect of my process on the mash produced as mentioned, is to allow the ethers to escape, and to neutralize the acids, and to greatly enhance the merchantable value of the high-wines or raw whiskey resulting from the distillation.

I have found that the same result may be produced by a solution of twenty pounds of single, or ten pounds of double carbonate of soda, or with ten pounds of Russia pearlash, or with fifty pounds of English soda in about forty gallons of water, used in a manner similar to that above described for the lime-water. But in all my experiments, I have found that the lime-water, besides being the cheapest, produced the best results, and therefore prefer it as a wash for mashes after fermentation, for the purpose of getting rid of the ether and neutralizing the acids.

Having thus described my invention,

What I claim, is—

The treatment of grain-mashes, worts, or beer, (produced by the patented processes mentioned,) after fermentation, and before distillation, with lime-water, or equivalent carbonate solutions, in the manner substantially as herein described, and for the purpose set forth.

NATHAN EISENDRATH.

Witnesses:
 WM. H. LOTZ.
 A. LINBERG.